United States Patent
Bansal et al.

(10) Patent No.: US 12,348,489 B2
(45) Date of Patent: Jul. 1, 2025

(54) AUTOMATIC SELECTION OF ENCRYPTED NETWORK CONNECTION BASED ON PREDICTED LATENCY

(71) Applicant: Microsoft Technology Licensing, LLC, Redmond, WA (US)

(72) Inventors: Gunjan Bansal, San Jose, CA (US); Abhishek Gupta, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 206 days.

(21) Appl. No.: 18/089,354

(22) Filed: Dec. 27, 2022

(65) Prior Publication Data

US 2024/0214353 A1    Jun. 27, 2024

(51) Int. Cl.
  *H04L 9/40* (2022.01)
  *H04L 41/16* (2022.01)
  *H04L 43/0864* (2022.01)

(52) U.S. Cl.
  CPC .......... *H04L 63/0272* (2013.01); *H04L 41/16* (2013.01); *H04L 43/0864* (2013.01); *H04L 63/0435* (2013.01)

(58) Field of Classification Search
  CPC . H04L 63/0272; H04L 41/16; H04L 43/0864; H04L 63/0435; H04L 63/0428
  See application file for complete search history.

(56) References Cited

U.S. PATENT DOCUMENTS

| | | | |
|---|---|---|---|
| 10,601,779 B1 * | 3/2020 | Matthews | H04L 67/141 |
| 11,063,881 B1 | 7/2021 | Vijayasuganthan et al. | |
| 2012/0027002 A1 * | 2/2012 | Jones | H04W 12/088 370/338 |
| 2020/0287976 A1 | 9/2020 | Theogaraj | |

OTHER PUBLICATIONS

"GetPerTcpConnectionEStats Function (iphipapi.h)", Retrieved from: https://learn.microsoft.com/en-us/windows/win32/api/iphipapi/nf-iphipapi-getpertcpconnectionestats, Oct. 13, 2021, 9 Pages.
International Search Report and Written Opinion received for PCT Application No. PCT/US23/081714, (MS# 412332-PCT01) mailed on Mar. 4, 2024, 16 pages.

* cited by examiner

*Primary Examiner* — Brian Whipple
(74) *Attorney, Agent, or Firm* — Workman Nydegger

(57) ABSTRACT

Automatically selecting an encrypted network connection (such as a VPN tunnel) to use when communicating through another encrypted connection node with which there are multiple encrypted network connections with the computing system. The selection is based predicted latency of that encrypted network connection. The prediction is based on round-trip times of communications over the respective encrypted network connection. This is quite difficult since the encrypted network connection itself is not the entire path of the outgoing message and corresponding incoming message.

20 Claims, 5 Drawing Sheets

AUTOMATIC SELECTION OF ENCRYPTED NETWORK CONNECTION BASED ON PREDICTED LATENCY

BACKGROUND

Encryption can be used to securely communicate over a public network. Even if the encrypted communication is intercepted, the intercepted communication is not decipherable due to the encryption. One way to establish encrypted communication is to use a Virtual Privacy Network (VPN) when communicating over a public network. A VPN connection is established between two computing systems that use a VPN tunnel to communicate with each other a public network.

This VPN connection is established below the network level in the protocol stack. Thus, the two computing systems on either end of the VPN tunnel need not be the network nodes themselves that are communicating network messages. For instance, a VPN gateway may communicate (using a VPN tunnel) over a public network with a VPN server, and that VPN server may then decrypt the message and route the decrypted message to the appropriate network node served by the VPN server.

When large volumes of communications are communicated between a VPN gateway and a VPN server, there may be a number of VPN tunnels established to handle that traffic. Regardless of the VPN tunnel used, the communication is protected via encryption between the VPN gateway and the VPN server.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the automatic selection of an encrypted network connection to use when communicating through another encrypted connection node with which there are multiple encrypted network connections with the computing system. As an example, the computing system may be a VPN gateway that has multiple VPN tunnels established with another VPN server. The VPN gateway may communicate with numerous network nodes through the other VPN server. The principles described herein select the encrypted network connection to use based on predicted latency of that encrypted network connection. This is quite difficult since the encrypted network connection itself is not the entire path of the outgoing message and corresponding incoming message. That is because the encrypted network connection level (e.g., the VPN tunnel level) is below the network layer in the protocol stack, and that tunnel is only one leg of the network communication between network nodes.

For each of at least some of a plurality of encrypted network connections, round-trip communications are each timed (that use the respective encrypted network communication). The timing of each of the plurality of round-trip communications results in generation of a plurality of round-trip times for each of the encrypted network connections. At least some of these generated round-trip times are then input to a latency prediction model that is configured to predict a latency of an encrypted network connection based on input round-trip times. Then, the encrypted network connection to use is selected based on that predicted latency. Accordingly, communication latency overall is reduced, since the amount of latency contributed by the encrypted network connection is reduced.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the automatic selection of an encrypted network connection to use when communicating through another encrypted connection node with which there are multiple encrypted network connections with the computing system. As an example, the computing system may be a VPN gateway that has multiple VPN tunnels established with one or more other VPN server(s).

The VPN gateway may communicate with numerous network nodes through the other VPN server(s). The principles described herein select the encrypted network connection to use based on predicted latency of that encrypted network connection. This is quite difficult since the encrypted network connection itself is not the entire path of the outgoing message and corresponding incoming message. That is because the encrypted network connection level (e.g., the VPN tunnel level) is below the network layer in the protocol stack, and that tunnel is only one leg of the network communication between network nodes.

For each of at least some of a plurality of encrypted network connections, round-trip communications are each timed (that use the respective encrypted network communication). The timing of each of the plurality of round-trip communications results in generation of a plurality of round-trip times for each of the encrypted network connections. At least some of these generated round-trip times are then input to a latency prediction model that is configured to predict a latency of an encrypted network connection based on input round-trip times. Then, the encrypted network connection to use is selected based on that predicted latency. Accordingly, communication latency overall is reduced, since the amount of latency contributed by the encrypted network connection is reduced.

Figure 1:
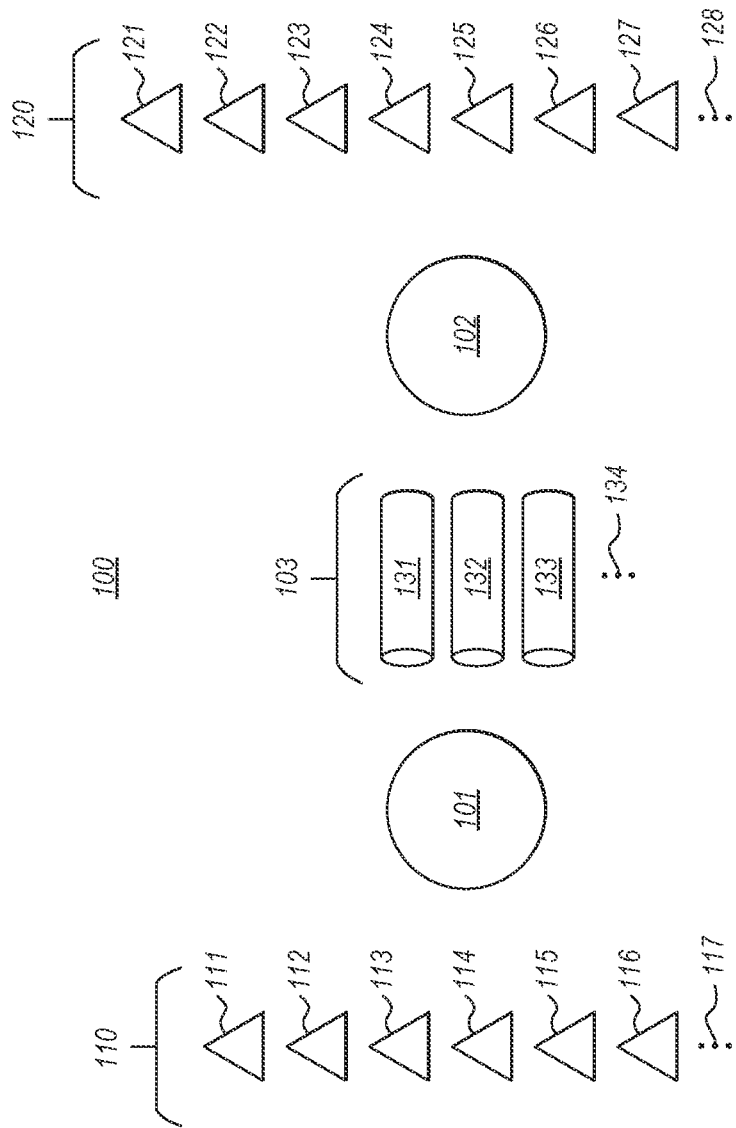
FIG. 1 illustrates a network environment in which the principles described herein may operate, the environment including two encrypted connection nodes that communicate over multiple encrypted network connections, and with each communicating with or being communicable with associated network nodes.

FIG. 1 illustrates a network environment 100 in which the principles described herein may operate. The network environment 100 includes two encrypted connection nodes 101 and 102, which are symbolized as circles to represent that they are endpoints for multiple encrypted network connections 103. In one example, the encrypted network connections are Virtual PrivateNetwork VPN tunnels. In that case, the encrypted connection nodes 101 and 102 are endpoints of the VPN tunnels. Accordingly, the two encrypted connection nodes 101 and 102 can securely communicate messages over a public network over any of the multiple encrypted network connections 103. If any of such messages are intercepted, the messages are intercept only in their encrypted form, and thus the message content is unlikely to be accessible.

In the illustrated example of FIG. 1, the encrypted network connections 103 includes three encrypted network connections 131, 132 and 133 illustrated as being established between the encrypted network connection nodes 101 and 102. However, the ellipsis 134 represents that there may any number (and perhaps a changing number) of encrypted network connections between the encrypted connection nodes 101 and 102, from zero to many. Nevertheless, because the principles described herein relate to selecting from one of multiple encrypted network connections, the principles described herein are most useful if there are at least two of such encrypted network connections between the encrypted connection nodes 101 and 102.

Some, and preferably all, of the encrypted network connections 103 operate below a network level that operates at a network layer in the protocol stack. Each of the encrypted network connections 103 does act as a tunnel through which network messages can be communicated. A "tunnel" is an appropriate term because 1) a tunnel is merely one leg of a route that message can take as the message goes from one network level node to another network level node, and 2) so long as the network traffic is within the tunnel, the contents of the network traffic cannot be visible from the outside (i.e., without the decryption keys). To represent this, each of the encrypted network connections 103 are illustrated as a tube.

In FIG. 1, each of the encrypted connection nodes 101 and 102 are illustrated as being in communication or communicable with any number of network nodes. For instance, the encrypted connection node 101 is in communication or communicable with any of the network nodes 110. Furthermore, the encrypted connection nodes 102 is in communication with any of the network nodes 120. In FIG. 1, the encrypted connection node 101 is shown as communicating with or communicable with six network nodes 111 through 116, though the ellipsis 117 represents that the encrypted connection node 101 may be in communication with or communicable with any number (any perhaps a changing number) of network nodes.

In FIG. 1, the encrypted connection node 102 is shown as communicating with or communicable with seven network nodes 121 through 127, though the ellipsis 128 represents that the encrypted connection node 101 may be in communication with or communicable with any number (any perhaps a changing number) of network nodes. However, each of the encrypted connection nodes may communicate with or be communicable with any number of network nodes. For instance, a single encrypted connection may be used to support hundreds, thousands or even more network connections. Thus, an encrypted network connection between nodes 101 and 102 may having tunneling through it many network connections between network nodes 110 and network nodes 120.

The network nodes 110 can establish network connections with the network nodes 120 using a network protocol. This ability is represented in FIG. 1 by the network nodes 110 and 120 each being represented by a triangle. On the other hand, the encrypted connection nodes 101 and 102 establish encrypted network connections to each other using an encryption tunneling protocol that is below the network layer in the protocol stack. Accordingly, when network nodes 110 and network nodes 120 communicate, the network messages use an encrypted network connection but need make no special provision to do so. Instead, the encrypted connection nodes 101 and 102 establish the appropriate encryption and decryption to enable the messages to be securely communicated with encryption between the encrypted connection nodes 101 and 102. Thus, to distinguish between the network nodes and encrypted connection nodes, the encrypted connection nodes 101 and 102 are illustrated as circles.

Figure 2:
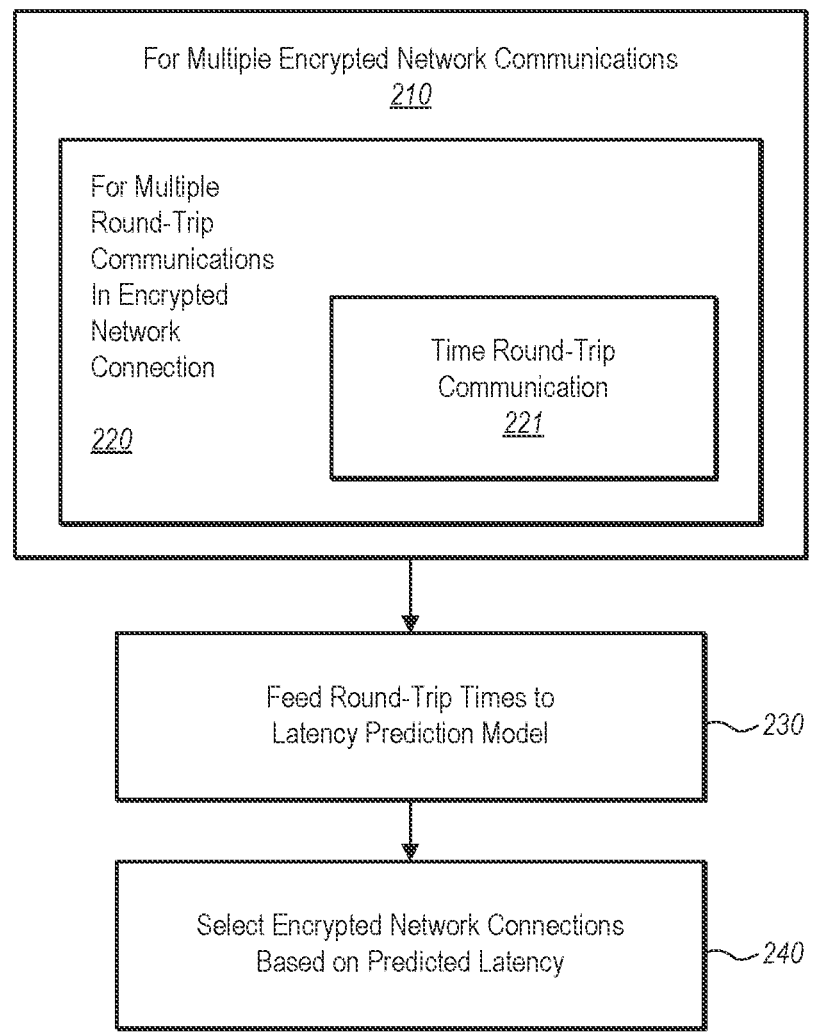
FIG. 2 illustrates a flowchart of a method for automatically selecting an encrypted network connection to use when communicating through another encrypted connection node, in accordance with the principles described herein.

FIG. 2 illustrates a flowchart of a method 200 for automatically selecting an encrypted network connection to use when communicating through another encrypted connection node. Specifically, the method 200 may be performed by an encrypted connection node in communicating with another encrypted connection node in an environment in which there are a multiple encrypted network connections between the encrypted network nodes. For example, the method 200 may be performed by the encrypted connection node 101 of FIG. 1 when selecting which of the encrypted network connections 103 to use when communicating with the other encrypted connection node 102.

This decision may be made once for each network connection, such that a single network connection uses only one encrypted network connection. Thus, in FIG. 1, the encrypted network connection 131 may be viewed as tunneling a certain set of network connections between respective network nodes 110 and respective network nodes 120. Similarly, the encrypted network connection 132 may be viewed as tunneling a certain different set of network connections between respective network nodes 110 and respective network nodes 120. Likewise, the encrypted network connection 133 may be viewed as tunneling a certain further different set of network connections between respective network nodes 110 and respective network nodes 120.

As the method 200 may be performed in the environment 100 of FIG. 1, as an example, the method 200 of FIG. 2 will now be described with respect to the environment 100 of FIG. 1. The method 200 includes timing a round-trip communication that uses the respect encrypted network connection (act 221). As represented by act 221 being within box 220, this timing is performed for multiple round-trip communications that use that encrypted network connection. Thus, this results in multiple round-trip timings (collectively called a "round-trip timing set") being generated for that encrypted network connection. Furthermore, as represented by the box 220 being contained within box 210, this is performed for multiple encrypted network connections.

Thus, for each of multiple encrypted network connections, there is a round-trip timing set generated. Thus, referring to FIG. 1, act 221 repeatedly performed in this way will result in a round-trip timing set being generated for encrypted network connection 131, a round-trip timing set being generated for encrypted network connection 132, and a round-trip timing set being generated for encrypted network connection 133. This route trip timing could be a Transmission Control Protocol (TCP) round trip time calculation for inner traffic through the tunnel. As another example, the round-trip time could be done by calculating tunnel to tunnel latency for example in IPSEC case where IKE informational messages can be used to measure.

Figure 3:
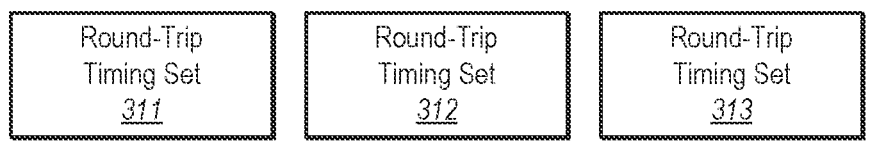
FIG. 3 thus illustrates an environment in which there are multiple round-trip timing sets generated, one set for each encrypted network connection.

FIG. 3 thus illustrates an environment 300 in which there are multiple round-trip timing sets generated, one set for each encrypted network connection. Specifically, the environment 300 includes round-trip timing set 311 that represents round-trip timings generated for the first encrypted network connection 131, round-trip timing set 312 that represents round-trip timings generated for the second encrypted network connection 132, and round-trip timing set 313 that represents round-trip timings generated for the first encrypted network connection 133.

The encrypted connection node 101 is well equipped to determine these timings because it can see content of the network messages in the clear, and thus can determine which two messages correspond to the same round trip. The encrypted connection node can thus keep the round-trip timing sets 311, 312 and 313 in its memory, or storage. In one embodiment, the encrypted connection node tracks a round-trip timing of a particular exchange between network nodes 110 and 120 performed when the network nodes first establish a network connection.

Figure 4:
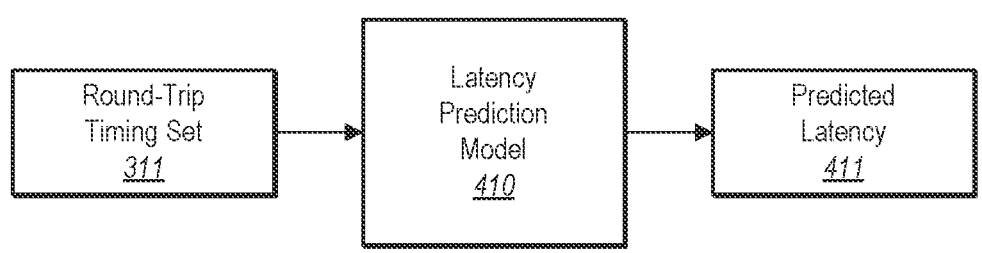
FIG. 4 illustrates an environment in which the round-trip timing set is fed as input to a latency prediction model resulting in a prediction of a latency of an associated encrypted network connection.

Referring back to FIG. 2, to predict the latency for each encrypted network connection, at least some of the generated round-trip times for that encrypted network connection are fed to a latency prediction model (act 230). For instance, FIG. 4 illustrates an environment 400 in which the round-trip timing set 311 is fed as input to a latency prediction model 410. The latency prediction model 410 is configured to predict a latency of the respective encrypted network connection based on input round-trip times. Accordingly, in response to receiving the round-trip timing set 311, the latency prediction model 410 outputs a prediction of the latency 411. For instance, if the latency prediction model is fed the round-trip timing set 311, the latency prediction model 410 outputs a latency prediction of the first encrypted network connection 131. If the latency prediction model is fed the second round-trip timing set 312, the latency prediction model 410 outputs a latency prediction of the second encrypted network connection 132. If the latency prediction model is fed the third round-trip timing set 313, the latency prediction model 410 outputs a latency prediction of the third encrypted network connection 133.

Referring back to the method 200 of FIG. 2, the encrypted network node may then select an encrypted network connection to use based on the predicted latencies (act 240). As an example, the encrypted network node 101 may select the encrypted network connection 131 if the predicted latency of the encrypted network connection 131 is lower than the predicted latencies of the other encrypted network connections 132 and 133. Similarly, the encrypted network node 101 may select the encrypted network connection 132 if the predicted latency of the encrypted network connection 132 is lower than the predicted latencies of the other encrypted network connections 131 and 133. Also, the encrypted network node 101 may select the encrypted network connection 132 if the predicted latency of the encrypted network connection 133 is lower than the predicted latencies of the other encrypted network connections 131 and 132. Alternatively, the predicted latency may be just one of several factors used to select an appropriate encrypted network connection to use.

Each round-trip timing set may be regularly updated. For example, the round-trip timing set may be only the most recent round-trip timing sets measured. As an example, perhaps only the last ten minutes of round-trip times are kept. Alternatively, perhaps the latency prediction model is configured to ignore or give lesser weight to round-trip timing measurements that are older than a certain amount, and thus fall outside of a more current window of time.

Alternatively, or in addition, perhaps outliers are removed from the round-trip timing set. For example, if there is a round-trip timing that shows more than twice the usual round trip time, this might indicate that the latency is not due to the encrypted network connection, but due to some unknown factor on the other side of the encrypted network connection. Thus, such outliers are not relevant to the latency contributed by the encrypted network connection itself. Alternatively, perhaps the latency prediction model is configured to ignore or give lesser weight to round-trip timing measurements that are outliers.

Figure 5:
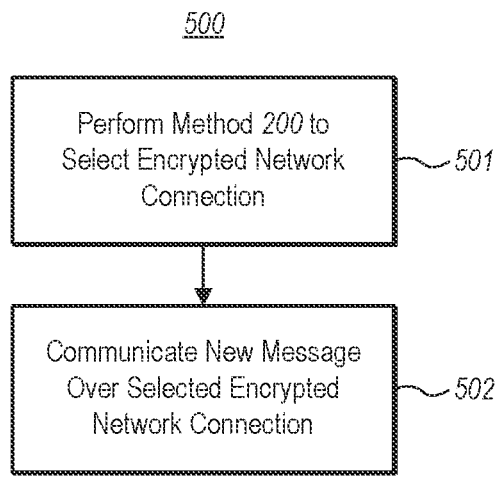
FIG. 5 illustrates a flowchart of a method for using a selection of an encrypted network connection.

FIG. 5 illustrates a flowchart of a method 500 for using a selection of an encrypted network connection. The method 500 may also be performed by the encrypted connection node 101 of FIG. 1. The method 500 includes performing the method 200 to thereby select an encrypted network connection to use (act 501). The method 500 thereafter includes using the selected encrypted network connection to communicate a network message (act 502). In this case, the method 200 may be performed in response to having to send a new network message through the other network connection node 102. For instance, this method 200 may be performed whenever there is a message associated with a newly created network connection between one of the network nodes 110 and one of the network nodes 120.

Figure 6:
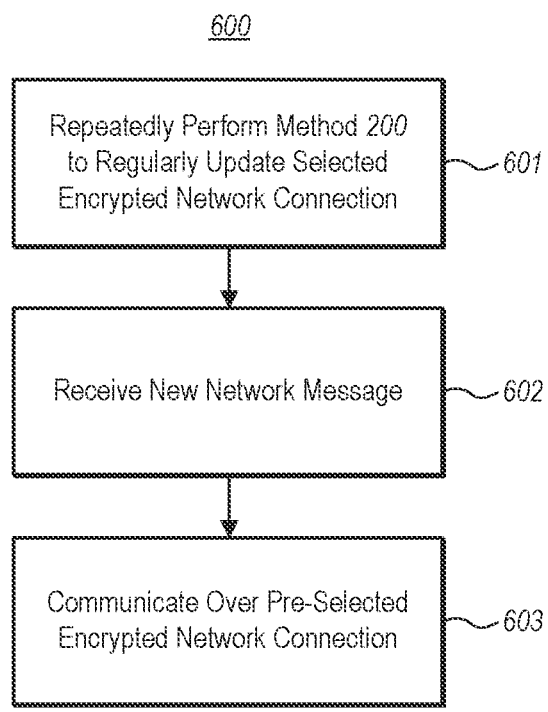
FIG. 6 illustrates a flowchart of a method for using a selection of an encrypted network connection, in accordance with another embodiment.

The method 200 of FIG. 2 may also be performed repeatedly in the background to constantly update whichever of the encrypted network connection happens to have the least latency at the time. For example, the method 200 may be performed every few minutes. Then, when a new network connection is being established, the method 200 does not have to be newly performed. Instead, whichever of the encrypted network connections happens to be previously selected is then used for communication of the network message. Thus, FIG. 6 shows a flowchart of a method 600 for using a selection of an encrypted network connection in an alternative embodiment. In this embodiment, the method 200 is repeatedly performed (act 601). When a new network connection is to be established (act 602), the previously selected encrypted network connection is used (act 603) for that network connection.

Accordingly, the principles described herein relate to the automatic selection of an encrypted network connection to use when communicating through another encrypted connection node with which there are multiple encrypted network connections with the computing system. As an example, the computing system may be a VPN gateway that has multiple VPN tunnels established with another VPN server. The VPN gateway may communicate with numerous network nodes through the other VPN server. The principles described herein select the encrypted network connection to use based on predicted latency of that encrypted network connection. This is quite difficult since the encrypted network connection itself is not the entire path of the outgoing message and corresponding incoming message. That is because the encrypted network connection level (e.g., the VPN tunnel level) is below the network layer in the protocol stack, and that tunnel is only one leg of the network communication between network nodes.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
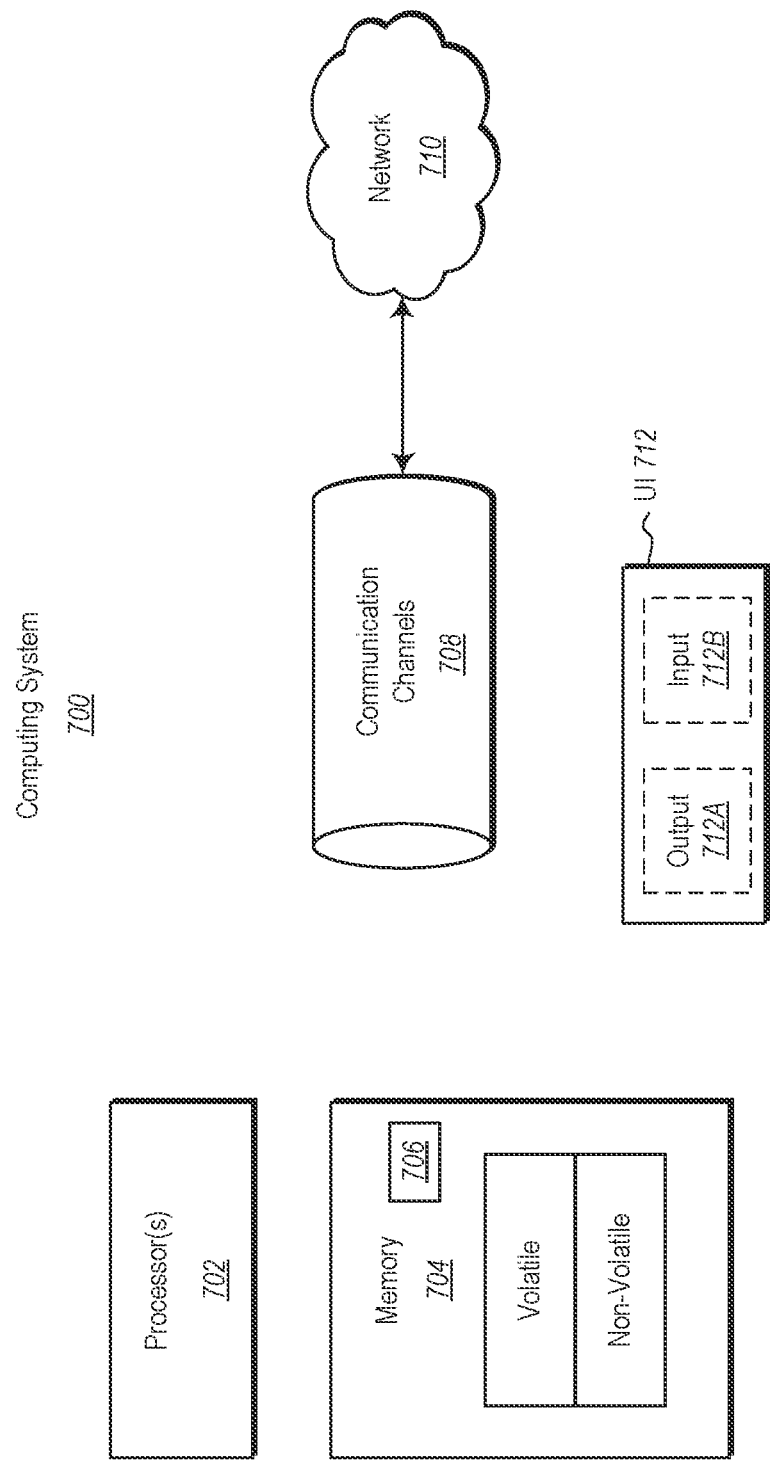
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that automatically selects an encrypted network connection, the computing system being a first network node and comprising:
   one or more processors; and
   one or more computer-readable media having thereon computer-executable instructions that are executable by the one or more processors to cause the computing system to:

access a first encrypted network connection that is established between the first network node and a second network node;

access a second encrypted network connection that is also established between the first network node and the second network node;

generate a first time set by timing a first set of round-trip communications between the first network node and the second network node, the first set of round-trip communications using the first encrypted network connection;

generate a second time set by timing a second set of round-trip communications between the first network node and the second network node, the second set of round-trip communications using the second encrypted network connection;

input at least some of the first time set to a latency prediction model, the latency prediction model using the at least some of the first time set to predict a first predicted latency of the first encrypted network connection;

input at least some of the second time set to the latency prediction model, the latency prediction model using the at least some of the second time set to predict a second predicted latency of the second encrypted network connection; and select one of the first encrypted network connection or the second encrypted network connection for use between the first network node and the second network node, said selecting being based on the first predicted latency and the second predicted latency.

2. The computing system in accordance with claim 1, the latency prediction model comprising a rules-based prediction model.

3. The computing system in accordance with claim 1, the latency prediction model comprising a trained neural network.

4. The computing system in accordance with claim 1, the first encrypted network connection comprising a Virtual Private Network (VPN) tunnel.

5. The computing system in accordance with claim 1, the first encrypted network connection being a connection that is below a network level.

6. The computing system in accordance with claim 1, the computer-executable instructions being further executable to cause the computing system to:
use the selected one of the first or second encrypted network connection to facilitate communications between the first network node and the second network node.

7. The computing system in accordance with claim 1, the computer-executable instructions being further executable to cause the computing system to:
determine that the first time set includes (i) a first subset of time data whose age exceeds a threshold age and (ii) a second time set of time data whose age does not exceed the threshold age; and
exclude the first subset of time data from being included in the at least some of the first time set that is input to the latency prediction model.

8. The computing system in accordance with claim 1, the computer-executable instructions being further executable to cause the computing system to:
determine that the first time set includes (i) a first subset of time data comprising outlier data and (ii) a second time set of time data that omits outlier data; and
exclude the first subset of time data from being included in the at least some of the first time set that is input to the latency prediction model.

9. The computing system in accordance with claim 1, the latency prediction model configured to apply a window of time to data inputted thereto such that any of the data inputted thereto falling outside of the window of time are excluded or given less weight by the latency prediction model.

10. The computing system in accordance with claim 1, the latency prediction model configured to exclude or give less weight to outlier round-trip times.

11. The computing system in accordance with claim 1, the computer-executable instructions being further executable to cause the computing system to repeatedly perform said selection.

12. The computing system in accordance with claim 11, the computer-executable instructions being further executable to cause the computing system to establish a network connection using the first encrypted network connection.

13. A method for automatically selecting an encrypted network connection, said method comprising:
accessing a first encrypted network connection that is established between the first network node and a second network node;
accessing a second encrypted network connection that is also established between the first network node and the second network node;
generating a first time set by timing a first set of round-trip communications between the first network node and the second network node, the first set of round-trip communications using the first encrypted network connection;
generating a second time set by timing a second set of round-trip communications between the first network node and the second network node, the second set of round-trip communications using the second encrypted network connection;
inputting at least some of the first time set to a latency prediction model, the latency prediction model using the at least some of the first time set to predict a first predicted latency of the first encrypted network connection;
inputting at least some of the second time set to the latency prediction model, the latency prediction model using the at least some of the second time set to predict a second predicted latency of the second encrypted network connection; and
selecting one of the first encrypted network connection or the second encrypted network connection for use between the first network node and the second network node, said selecting being based on the first predicted latency and the second predicted latency.

14. The method in accordance with claim 13, the latency prediction model comprising a rules-based prediction model.

15. The method in accordance with claim 13, the latency prediction model comprising a trained neural network.

16. The method in accordance with claim 13, the second encrypted network connection comprising a Virtual Private Network (VPN) tunnel.

17. The method in accordance with claim 13, further comprising:
use the selected one of the first or second encrypted network connections to facilitate communications between the first network node and the second network node.

18. The method in accordance with claim 13, the method being repeatedly performed.

19. The method in accordance with claim 18, the method further comprising using the first encrypted network connection to facilitate communications between the first network node and the second network node.

20. A computing system comprising:
one or more processors; and
one or more hardware storage devices that store instructions that are executable by the one or more processors to cause the computing system to:
  access a first encrypted network connection that is established between the first network node and a second network node;
  access a second encrypted network connection that is also established between the first network node and the second network node;
  generate a first time set by timing a first set of round-trip communications between the first network node and the second network node, the first set of round-trip communications using the first encrypted network connection;
  generate a second time set by timing a second set of round-trip communications between the first network node and the second network node, the second set of round-trip communications using the second encrypted network connection;
  input at least some of the first time set to a latency prediction model, the latency prediction model using the at least some of the first time set to predict a first predicted latency of the first encrypted network connection;
  input at least some of the second time set to the latency prediction model, the latency prediction model using the at least some of the second time set to predict a second predicted latency of the second encrypted network connection;
  select the first encrypted network connection to transmit communications between the first network node and the second network node, said selecting being based on the first predicted latency and the second predicted latency.

\* \* \* \* \*